United States Patent
Duesel, Jr. et al.

(10) Patent No.: US 7,416,172 B2
(45) Date of Patent: Aug. 26, 2008

(54) SUBMERGED GAS EVAPORATORS AND REACTORS

(75) Inventors: Bernard F. Duesel, Jr., Goshen, NY (US); John P. Gibbons, Cornwall, NY (US); Michael J. Rutsch, Tulsa, OK (US)

(73) Assignee: Liquid Solutions LLC, Maryland Heights, MO (US)

( * ) Notice: Subject to any disclaimer, the term of this patent is extended or adjusted under 35 U.S.C. 154(b) by 190 days.

(21) Appl. No.: 11/186,459

(22) Filed: Jul. 21, 2005

(65) Prior Publication Data

US 2007/0114683 A1 May 24, 2007

(51) Int. Cl.
*B01F 3/04* (2006.01)
(52) U.S. Cl. .................. 261/77; 261/123; 261/124
(58) Field of Classification Search ............. 261/77, 261/121.1, 122.1, 123, 124, DIG. 9
See application file for complete search history.

(56) References Cited

U.S. PATENT DOCUMENTS

| | | | | |
|---|---|---|---|---|
| 2,387,818 | A | * | 10/1945 | Wethly .................. 422/241 |
| 2,468,455 | A | | 4/1949 | Metziger |
| 2,721,065 | A | * | 10/1955 | Ingram .................. 261/124 |
| 2,790,506 | A | | 4/1957 | Vactor |
| 2,867,972 | A | | 1/1959 | Hokderreed et al. |
| 2,890,166 | A | | 6/1959 | Heinze |

(Continued)

FOREIGN PATENT DOCUMENTS

| | | |
|---|---|---|
| DE | 556 455 | 8/1932 |
| DE | 11 73 429 | 7/1964 |
| FR | 2 441 817 | 6/1980 |
| GB | 383 570 | 11/1932 |
| GB | 463 770 | 4/1937 |
| WO | WO-2004/022487 | 3/2004 |

(Continued)

OTHER PUBLICATIONS

A.G. Jones, *Liquid Circulation in a Draft-Tube Bubble Column*, Chemical Engineering Science, vol. 40, No. 3, pp. 449-462, 1985, Pergamon Press Ltd., Great Britain.

(Continued)

*Primary Examiner*—Scott Bushey
(74) *Attorney, Agent, or Firm*—Marshall, Gerstein & Borun LLP

(57) ABSTRACT

A submerged gas processor in the form of an evaporator or a submerged gas reactor includes a vessel, a gas delivery tube partially disposed within the vessel to deliver a gas into the vessel and a process fluid inlet that provides a process fluid to the vessel at a rate sufficient to maintain a controlled constant level of fluid within the vessel. A weir is disposed within the vessel adjacent the gas delivery tube to form a first fluid circulation path between a first weir end and a wall of the vessel and a second fluid circulation path between a second weir end and an upper end of the vessel. During operation, gas introduced through the tube mixes with the process fluid and the combined gas and fluid flow at a high rate with a high degree of turbulence along the first and second circulation paths defined around the weir, thereby promoting vigorous mixing and intimate contact between the gas and the process fluid. This turbulent flow develops a significant amount of interfacial surface area between the gas and the process fluid resulting in a reduction of the required residence time of the gas within the process fluid to; achieve thermal equilibrium and/or to drive chemical reactions to completion, all of which leads to a more efficient and complete evaporation, chemical reaction, or combined evaporation and chemical reaction process.

21 Claims, 6 Drawing Sheets

U.S. PATENT DOCUMENTS

| | | | |
|---|---|---|---|
| 2,981,250 A | 4/1961 | Steward | |
| 3,060,921 A | 10/1962 | Luring et al. | |
| 3,432,399 A | 3/1969 | Schutt | |
| 3,756,580 A * | 9/1973 | Dunn | 261/123 |
| 3,762,893 A * | 10/1973 | Larsen | 48/127.1 |
| 3,782,300 A | 1/1974 | White et al. | |
| 3,840,002 A | 10/1974 | Douglas et al. | |
| 3,925,148 A | 12/1975 | Erwin | |
| 4,070,423 A * | 1/1978 | Pierce | 261/77 |
| 4,119,538 A | 10/1978 | Yamauchi et al. | |
| 4,230,536 A | 10/1980 | Sech | |
| 4,648,973 A | 3/1987 | Hultholm et al. | |
| 4,683,062 A | 7/1987 | Krovak et al. | |
| 4,863,644 A * | 9/1989 | Harrington et al. | 261/77 |
| 4,938,899 A * | 7/1990 | Oros et al. | 261/123 |
| 5,032,230 A | 7/1991 | Shepherd | |
| 5,132,090 A | 7/1992 | Volland | |
| 5,342,482 A | 8/1994 | Duesel et al. | |
| 5,585,005 A | 12/1996 | Smith et al. | |
| 5,636,623 A | 6/1997 | Panz et al. | |
| 5,934,207 A | 8/1999 | Echols et al. | |
| 5,968,352 A * | 10/1999 | Ditzler | 210/220 |
| 6,149,137 A * | 11/2000 | Johnson et al. | 261/27 |
| 6,293,277 B1 | 9/2001 | Panz et al. | |
| 6,402,816 B1* | 6/2002 | Trivett et al. | 95/226 |
| 2001/0013666 A1* | 8/2001 | Nomura et al. | 261/93 |
| 2004/0045681 A1 | 3/2004 | Bolton et al. | |

OTHER PUBLICATIONS

Hirotsugu Hattori et al., *Fluid and Solids Flow Affecting the Solids Circulation Rate in Spouted Beds with a Draft Tube*, Journal of Chemical Engineering of Japan, vol. 37, No. 9, pp. 1085-1091, 2004, Shinshu University, Japan.

M. Yoshino et al., *Removal and Recovery of Phosphate and Ammonium as Struvite from Supernatant in Anaerobic Digestion*, Water Science and Technology, vol. 48, No. 1, pp. 171-178, 2003, IWA Publishing, Japan.

D. Fox et al., *Control Mechanisms of Flulidized Solids Circulation Between Adjacent Vessels*, AIChE Journal, Dec. 1989, vol. 35, No. 12, pp. 1933-1941, Universite de Technologie de Compiegne, France.

Liang-Shih Fan et al., *Some Remarks On Hydrodynamic Behavior Of A Draft Tube Gas-Liquid-Solid Fluidized Bed*, Department of Chemical Engineering, The Ohio State University, Columbus, Ohio 43210, Apr. 2006.

N.D. Barrett et al., *The Industrial Potential And Economic Viability Of Spouted Bed Processes*, Chemeca 85, paper D4c, pp. 401-405, The Thirteenth Australasian Conference On Chemical Engineering, Perth, Australia, Aug. 1985.

J.K. Claflin, *Intraparticle Conduction Effects On The Temperature Profiles In Spouted Beds*, Chemeca 85, paper D9b, pp. 471-475, The Thirteenth Australasian Conference On Chemical Engineering, Perth, Australia, Aug. 1985.

Dawn Smith, *Sludge-U-Like, As The Ban On Sea Disposal Of Sewage Waste Looms, Technologies That Can Deliver Cleaner, Thicker And More Farmer-Friendly Sludges Are Gaining Popularity*, Water Bulletin 708, Jun. 21, 1996.

Harry Brandt, et al., *Treatment Process For Waste Water Disposal Of The "Morcinek" Mine Using Coalbed Methane*, Conference On Coalbed Methane Utilization, Oct. 5-7, 1994, Katowice, Poland.

Yutaka Miyake et al., *Performance Characteristics Of High Speed-Type Cross Flow Turbine*, 1993.

Ho-Ming Yeh et al., *Double-Pass Heat Or Mass Transfer Through A Parallel-Plate Channel with Recycle*, International Journal of Hat and Mass Transfer 43 pp. 487-491, 2000, Department of Chemical Engineering, Tamkang University, Tamisui, Taipei 251, Taiwan.

Sathyanarayana et al., *Circular C.W. Intake System—A Research Opinion*, Seventh Technical Conference of the British Pump Manufacturer's Association, paper 21, pp. 293-313, 1981.

Caridad Talbert et al., *The Elecrospouted Bed*, IEEE Transactions on Industry Applications, vol. 1A-20, No. 5, Sep./Oct. 1984, pp. 1220-1223.

Wayne J. Genck, *Guidelines For Crystallizer Selection And Operation*, CEP, Oct. 2004, pp. 26-32. www.cepmagazine.org.

M. K. Bennett et al., *Design Of A Software Application For The Simulation And Control Of Continuous And Batch Crystallizer Circuits*, Advances in Engineering Software 33, 2002, pp. 365-374, Department of Chemical and Biochemical Engineering, Faculty of Engineering Science, University of Western Ontario, London, Ont. Canada N6A 5B9.

G. A. St. Onge et al., *Start-Up, Testing, And Performance Of The First Bulb-Type Hydroelectric Project In The U.S.A.*, IEEE Transactions on Power Apparatus Systems, vol. PAS-101, No. 6, Jun. 1982, pp. 1313-1321.

Nely T. Padial et al., *Three-Dimensional Simulation Of A Three-Phase Draft-Tube Bubble Column*, Chemical Engineering Science 55 (2000), pp. 3261-3273.

J. K. Claflin et al., *The Use Of Spouted Beds For The Heat Treatment Of Grains*, Chemeca 81, The 9th Australasian Conference on Chemical Engineering, Christchurch, New Zealand, Aug. 30 to Sep. 4, 1981, pp. 65-72.

R. Swaminathan et al., *Some Aerodynamic Aspects Of Spouted Beds Of Grains*, Department of Chemical Engineering, McGill University, Montreal, Quebec, Canada, pp. 197-204, Apr. 2006.

W.A. Cross et al., *Leachate Evaporation By Using Landfill Gas*, Proceedings Sardinia 97, Sixth Landfill Symposium, S. Margherita di Pula, Cagliari, Italy, Oct. 13-17, 1997, pp. 413-422.

Z. H. Ye et al., *Removal And Distribution Of Iron, Manganese, Cobalt, And Nickel Within A Pennsylvania Constructed Wetland Treating Coal Combustion By-Product Leachate*, J. Environ. Qual. 30:1464-1473, 2001.

R. Williams et al., *Aspects Of Submerged Combustion As A Heat Exchange Method*, Trans IChemE, vol. 71, Part A, May 1993, pp. 308-309.

J. C. Mueller et al., *Rotating Disk Looks Promising For Plant Wastes*, Apr. 2006.

Kenneth Dunn, *Incineration's Role In Ultimate Disposal Of Process Wastes*, Chemical Engineering, Deskbook Issue, Oct. 6, 1975, pp. 141-150.

Harry Berg, *The Development Of The Controlled Buoyancy System For Installation Of Submerged Pipelines*, Journal AWWA, Water Technology/Quality, Mar. 1977, pp. 214-218.

Yasutoshi Shimizu et al., *Filtration Characteristics Of Hollow Fiber Microfiltration Membranes Used In Membrane Bioreactor For Domestic Wastewater Treatment*, Wat. res. vol. 30, No. 10, pp. 2385-2392, 1996.

Philip Bachand et al., *Denitrification In Constructed Free-Water Surface Wetlands: II. Effects Of Vegetation And Temperature*, Ecological Engineering 14, pp. 17-32, 2000.

M. Etzensperger et al., *Phenol Degradation In A Three-Phase Biofilm Fluidized Sand Bed Reactor*, Bioprocess Engineering 4, pp. 175-181, 1989.

G. I. Cherednichenko et al., *Disposal Of Saline Wastes From Petroleum Refineries*, All-Union Scientific-Research and Planning-Design Institute of the Petroleum Refining and Petrochemical Industry, Translated from Khimiya I Tekhnologiya Topliv I Masel, No. 9, pp. 37-39, Sep. 1974

E. L. Durkee et al., *Field Tests Of Salt Recovery System For Spent Pickle Brine*, Apr. 2006.

Marko Hocevar et al., *The Influence Of Draft-Tube Pressure Pulsations On The Cavitation-Vortex Dynamics In A Francis Turbine*, Journal of Mechanical Engineering 49, 2003, pp. 484-498.

German Kurz, *Tauchbrenner*, OI U. Gasfeuerung, 18 (3), 1973, pp. 171-180.

Alabovskij et al., *Evaporation Des Eaux De Levage De Chaudieres Dans Des Appareils A Combustion Immergee*, Promyshl. Energet, 1975 (4), pp. 38-39.

International Search Report issued in PCT/US2006/028515 mailed on Nov. 14, 2006.

Schoene. O, "Die Entolung des Abdampfes und der Kondensate von Kolbendampfmaschinen," Braunkohle, 31:82-92 (1932).

Preliminary Report on Patentability for PCT/US2006/0285.

* cited by examiner

SUBMERGED GAS EVAPORATORS AND REACTORS

FIELD OF THE DISCLOSURE

The present disclosure relates generally to devices that mix gases and liquids, and more specifically, to submerged gas processors including submerged gas evaporators and submerged gas reactors.

BACKGROUND

Submerged gas evaporators, submerged gas reactors and combination submerged gas evaporator/reactor systems in which gas is dispersed within the liquid phase, referred to generally herein as submerged gas processors, are well known types of devices used in many industries to perform evaporation and chemical reaction processes with respect to various constituents. U.S. Pat. No. 5,342,482 discloses a common type of submerged combustion gas evaporator, in which combustion gas is generated and delivered though an inlet pipe to a dispersal unit submerged within the liquid to be evaporated. The dispersal unit includes a number of spaced-apart gas delivery pipes extending radially outward from the inlet pipe, each of the gas delivery pipes having small holes spaced apart at various locations on the surface of the gas delivery pipe to disperse the combustion gas as small bubbles as uniformly as practical across the cross-sectional area of the liquid held within the processing vessel. According to current understanding within the prior art, this design provides desirable intimate contact between the liquid and the combustion gas over a large interfacial surface area while also promoting thorough agitation of the liquid within the processing vessel.

Because submerged gas processors do not employ heat exchangers with solid heated surfaces, these devices provide a significant advantage when compared to conventional evaporators or chemical reactors when contact between a liquid stream and a gas stream is desirable. In fact, submerged gas processors are especially advantageous when the desired result is to highly concentrate a liquid stream by means of evaporation.

However, many feed streams, prior to reaching a desired concentration and/or while undergoing chemical reactions, produce solids in the form of precipitates that are difficult to handle. These precipitates may include substances that form deposits on the solid surfaces of heat exchangers used in conventional evaporators and reactors, and substances that tend to form large crystals or agglomerates that can block passages within processing equipment, such as the gas exit holes in the system described in U.S. Pat. No. 5,342,482. Generally speaking, feed streams that cause deposits to form on surfaces and create blockages within process equipment are called fouling fluids.

Additionally, common problems within conventional evaporation and chemical reaction systems used for processing fouling fluids include deterioration of the rate of heat transfer over time due to the buildup of deposits on solid heat exchange surfaces and equipment malfunctions related to blockages in critical locations such as gas outlet pipes. These common problems adversely affect the efficiency and costs of conventional processes in that the potential for buildup of deposits and blockages necessitate frequent cleaning cycles to avoid sudden failures within the evaporation or reaction equipment.

Additionally, most evaporation and chemical reactor systems that rely on intimate contact between gases and liquids are prone to problems related to carryover of entrained liquid droplets that form as the vapor phase disengages from the liquid phase. For this reason, most evaporator and reactor systems that require intimate contact of gas with liquid include one or more devices to minimize entrainment of liquid droplets and/or to capture entrained liquid droplets while allowing for separation of the entrained liquid droplets from the exhaust gas flowing out of the evaporation zone. The need to mitigate carryover of entrained liquid droplets may be related to one or more factors including conformance with environmental regulations, conformance with health and safety regulations and controlling losses of material that might have significant value.

Unlike conventional evaporators and reactors where heat is transferred to the material being processed through heat exchangers with solid surfaces, heat and mass transfer within submerged gas processors take place at the interface of a discontinuous gas phase dispersed within a continuous liquid phase. Compared to the fixed solid heat transfer surfaces employed in conventional evaporators and reactors, fouling fluids cannot coat the heat transfer surface within submerged gas processors as new surface area is constantly being formed by a steady flow of gas which is dispersed within the liquid phase and remains in contact with the liquid for a finite period of time before disengaging. This finite period of time is called the residence time of the gas within the evaporation, or evaporation/reaction zone.

Submerged gas processors also tend to mitigate the formation of large crystals because dispersing the gas beneath the liquid surface promotes vigorous agitation within the evaporation or the evaporation/reaction zone, which is a less desirable environment for crystal growth than a more quiescent zone. Further, active mixing within an evaporation or reaction vessel tends to maintain precipitated solids in suspension and thereby mitigates blockages that are related to settling and/or agglomeration of suspended solids.

However, mitigation of crystal growth and settlement is dependent on the degree of mixing achieved within a particular submerged gas processor, and not all submerged gas processor designs provide adequate mixing to prevent large crystal growth and related blockages. Therefore, while the dynamic renewable heat transfer surface area feature of submerged gas processors eliminates the potential for fouling liquids to coat heat exchange surfaces, conventional submerged gas processors are still subject to potential blockages and carryover of entrained liquid within the exhaust gas flowing away from the evaporation zone.

Direct contact between hot gas and liquid undergoing processing within a submerged gas processor provides excellent heat transfer efficiency. If the residence time of the gas within the liquid is adequate for the gas and liquid temperatures to equalize, a submerged gas processor operates at a high level of overall energy efficiency. For example, when hot gas is dispersed in a liquid that is at a lower temperature than the gas and the residence time is adequate to allow the gas and liquid temperatures to attain the adiabatic operating temperature for the system, all of the available driving force of temperature differential will be used to transfer thermal energy from the gas to the liquid. The minimum residence time to attain equilibrium of gas and liquid temperatures within the evaporation, reaction or combined reaction/evaporation zone of a submerged gas processor is a function of factors that include, but are not limited to, the temperature differential between the hot gas and liquid, the properties of the gas and liquid phase components, the properties of the resultant gas-liquid mixture, the net heat absorbed or released through any chemical reactions and the extent of interfacial surface area generated as the hot gas is dispersed into the liquid.

Given a fixed set of values for temperature differential, properties of the gas and the liquid components, properties of the gas-liquid mixture, heats of reaction and the extent of the interfacial surface area, the residence time of the gas is a function of factors that include the difference in specific gravity between the gas and liquid or buoyancy factor, and other forces that affect the vertical rate of rise of the gas through the liquid phase including the viscosity and surface tension of the liquid. Additionally, the flow pattern of the liquid including any mixing action imparted to the liquid such as that created by the means chosen to disperse the gas within the liquid affect the rate of gas disengagement from the liquid.

Submerged gas processors may be built in various configurations. One common type of submerged gas processor is the submerged combustion gas evaporator that generally employs a pressurized burner mounted to a gas inlet tube that serves as both a combustion chamber and as a conduit to direct the combustion gas to a dispersion system located beneath the surface of liquid held within an evaporation vessel. The pressurized burner may be fired by any combination of conventional liquid or gaseous fuels such as natural gas, oil or propane, any combination of non-conventional gaseous or liquid fuels such as biogas or residual oil, or any combination of conventional and non-conventional fuels.

Other types of submerged gas processors include hot gas evaporators where hot gas is either injected under pressure or drawn by an induced pressure drop through a dispersion system located beneath the surface of liquid held within an evaporation vessel. While hot gas evaporators may utilize combustion gas such as hot gas from the exhaust stacks of combustion processes, gases other than combustion gases or mixtures of combustion gases and other gases may be employed as desired to suit the needs of a particular evaporation process. Thus, waste heat in the form of hot gas produced in reciprocating engines, turbines, boilers or flare stacks may be used within hot gas evaporators. In other forms, hot gas evaporators may be configured to utilize specific gases or mixtures of gases that are desirable for a particular process such as air, carbon dioxide or nitrogen that are heated within heat exchangers prior to being injected into or drawn through the liquid contained within an evaporation vessel.

Regardless of the type of submerged gas processor or the source of the gas used within a processor, in order for the process to continuously perform effectively, reliably and efficiently, the design of the submerged gas processor must include provisions for efficient heat and mass transfer between gas and liquid phases, control of entrained liquid droplets within the exhaust gas, mitigating the formation of large crystals or agglomerates of particles and maintaining the mixture of solids and liquids within the submerged gas processing vessel in a homogeneous state to prevent settling of suspended particles carried within the liquid feed and/or precipitated solids.

SUMMARY OF THE DISCLOSURE

A simple and efficient submerged gas processor includes an evaporation, reaction or combination evaporation/reaction vessel, a tube partially disposed within the vessel which is adapted to transport a gas into the interior of the vessel, a process fluid inlet adapted to transport a process fluid into the vessel at a rate that maintains the process fluid inside the vessel at a predetermined level and an exhaust stack that allows spent gas to flow away from the vessel. In addition, the submerged gas processor includes a weir disposed within the reaction vessel. The weir may at least partially surround the tube and may be submerged in the process fluid to create a fluid circulation path around the weir within the vessel. In one embodiment, the weir is open at both ends and forms a lower circulation gap between a first one of the weir ends and a bottom wall of the vessel and an upper circulation gap between a second one of the weir ends and a normal process fluid operating level.

During operation, gas introduced through the tube mixes with the process fluid in a first confined volume formed by the weir, and the fluid mixture of gas and liquid flows at high volume with a high degree of turbulence along the circulation path defined around the weir, thereby causing a high degree of mixing between the gas and the process fluid and any suspended particles within the process fluid. Shear forces within this two-phase or three-phase turbulent flow that result from the high density liquid phase overrunning the low density gas phase create extensive interfacial surface area between the gas and the process fluid that favors minimum residence time for mass and heat transfer between the liquid and gas phases to come to equilibrium compared to conventional gas dispersion techniques. Still further, vigorous mixing created by the turbulent flow hinders the formation of large crystals of precipitates within the process fluid and, because the system does not use small holes or other ports to introduce the gas into the process fluid, clogging and fouling associated with other submerged gas processors are significantly reduced or entirely eliminated. Still further, the predominantly horizontal flow direction of the liquid and gas mixture over the top of the weir and along the surface of the process fluid within the processing vessel enables the gas phase to disengage from the process fluid with minimal entrainment of liquid due to the significantly greater momentum of the much higher density liquid that is directed primarily horizontally compared to the low density gas with a relatively weak but constant vertical momentum component due to buoyancy.

In addition, a method of processing fluid using a submerged gas processor includes providing a process fluid to a vessel of a submerged gas processor at a rate sufficient to maintain the fluid level at a predetermined level within the vessel, supplying a gas to the vessel, and mixing the gas and process fluid within the vessel by causing the gas and process fluid to flow around a weir within the submerged gas processor to thereby transfer heat energy and mass between the gas and liquid phases of a mixture and/or to otherwise react constituents within the gas and liquid phases of a mixture.

DETAILED DESCRIPTION

Figure 1:
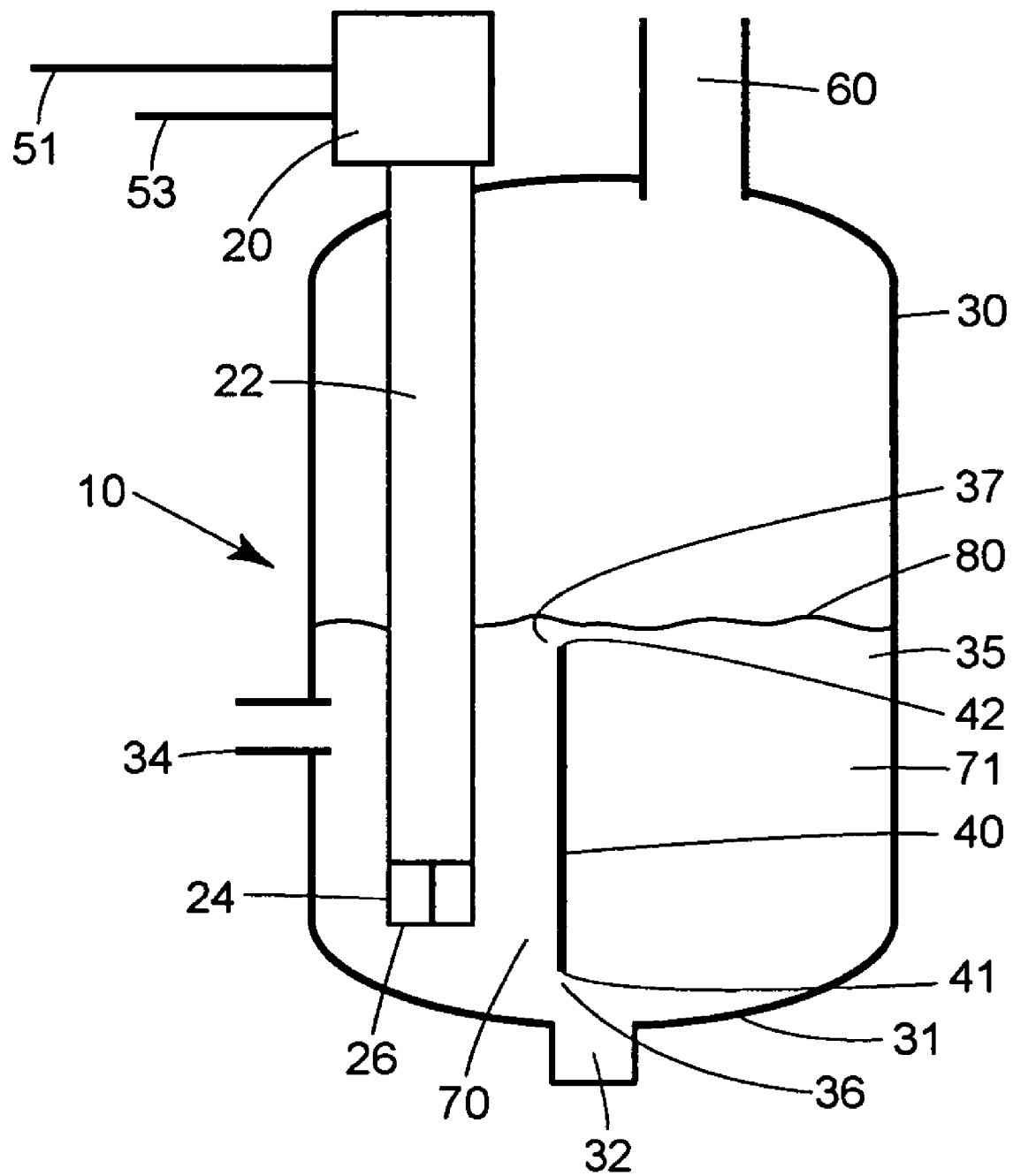
FIG. 1 is a cross-sectional view of a submerged gas processor constructed in accordance with the teachings of the disclosure.

Referring to FIG. 1, a submerged gas processor 10, in the form of a submerged combustion gas evaporator, includes a burner 20 and a hot gas supply tube or gas inlet tube 22 having sparge or gas exit ports 24 at or near an end 26 thereof. The gas inlet tube 22 is disposed within an evaporator vessel 30 having a bottom wall 31 and a process fluid outlet port 32. A process fluid inlet port 34 is disposed in one side of the vessel 30 and enables a process fluid 35 (and other liquids) to be provided into the interior of the vessel 30. Additionally, a weir 40, which is illustrated in FIG. 1 as a flat or solid plate member having a first or lower end 41 and a second or upper end 42, is disposed within the vessel 30 adjacent the gas inlet tube 22. The weir 40 defines and separates two volumes 70 and 71 within the vessel 30. As illustrated in FIG. 1, a gas exit port 60 disposed in the top of the vessel 30 enables gas to exit from the interior of the vessel 30.

In the submerged combustion gas evaporator of FIG. 1, the burner 20, which may be a nozzle mix or pre-mix type of pressurized burner, is supplied with fuel under pressure from a blower or pump (not shown in FIG. 1) through a line 51 and is supplied with air under pressure from a blower (not shown in FIG. 1) through a line 53. Moreover, the process fluid 35 may be supplied through the fluid inlet 34 by a pump (not shown in FIG. 1) at a rate sufficient to maintain a surface 80 of the process fluid 35 within the vessel 30 at a predetermined level, which may be set by a user. A level sensor and control (not shown in FIG. 1) may be used to determine and control the rate that the process fluid 35 is supplied through the inlet port 34.

As illustrated in FIG. 1, the weir 40 is mounted within the vessel 30 to form a lower circulation gap 36 between the first end 41 of the weir 40 and the bottom wall 31 of the vessel 30 and to form an upper circulation gap 37 between the second end 42 of the weir 40 and the surface 80 of the process fluid 35 (or the top wall of the vessel 30). As will be understood, the upper end 42 of the weir 40 is preferably set to be at or below the surface level 80 of the process fluid 35 when the process fluid 35 is at rest (i.e., when no gas is being introduced into the vessel via the gas inlet tube 22). In some situations, it may be possible to set the upper end 42 of the weir 40 slightly above the at rest level of the process fluid 80, as long as introduction of the gas via the gas inlet tube 22 still causes liquid to flow over the upper end 42 of the weir 40. In any event, as illustrated in FIG. 1, the weir 40 also defines and separates the confined volume or space 70 in which the sparge ports 24 are located from the volume or space 71. If desired, the weir 40 may be mounted to the vessel 30 via welding, bolts or other fasteners attached to internal side walls of the vessel 30.

During operation, a pressurized mixture of gas and air from the lines 51 and 53 is ignited within the burner 20 and is forced to flow under pressure into and through the gas inlet tube 22 where combustion of the fuel is completed before the combusted fuel/air mixture (hereinafter "combustion gas") reaches the sparge or exit ports 24. The combustion gas exits the gas inlet tube 22 through the sparge ports 24 into the confined volume 70 formed between the weir 40 and the gas inlet tube 22, causing the combustion gas to be dispersed into the continuous liquid phase of the process fluid within the vessel 30. Generally speaking, gas exiting from the sparge ports 24 mixes with the liquid phase of the process fluid within the confined volume 70 and causes a high volume flow pattern to develop around the weir 40. The velocity of the flow pattern and hence the turbulence associated with the flow pattern is highest within the confined volume 70 and at the locations where the liquid flows through the upper gap 37 and the lower gap 36 of the weir 40. The turbulence within the confined volume 70 significantly enhances the dispersion of the gas into the process fluid which, in turn, provides for efficient heat and mass transfer between the gas and the process fluid. In particular, after exiting the sparge ports 24, the combustion gas is dispersed as a discontinuous phase into a continuous liquid phase of the process fluid forming a gas/liquid mixture within the confined volume 70. The mass per unit volume of the gas/liquid mixture in the confined volume 70 is significantly less than that of the continuous liquid phase of the process fluid in the volume 71. Due to this large difference in mass per unit volume of the liquid compared to the gas, typically on the order of approximately 1000 to 1, a difference in static hydraulic pressure is formed between the gas/liquid mixture in the confined volume 70 and the liquid phase in the volume 71 at all elevations. This imbalance in static hydraulic pressure forces the process fluid to flow from the higher pressure region, i.e., the volume 71, to the lower pressure region, i.e., the confined volume 70, at a rate that overcomes the impressed static hydraulic pressure imbalance and creates flow upward through the confined volume 70.

Put another way, the dispersion of gas into the process fluid 35 within the confined volume 70 at the sparge ports 24 develops a continuous flow pattern that draws process fluid 35 under the bottom edge 41 of the weir 40 through the lower circulation gap 36, and causes the mixture of gas and process fluid 35 to move through the confined volume 70 and toward the surface 80 of the process fluid 35.

Near the surface 80, the gas/liquid mixture reaches a point of balance at which the imbalance of static hydraulic pressure is eliminated. Generally speaking, this point is at or near the upper circulation gap 37 formed between the second end 42 of the weir 40 and the process fluid surface 80. At the balance point, the force of gravity, which becomes the primary outside force acting on the gas/fluid mixture, gradually reduces the vertical momentum of the gas/liquid mixture to near zero. This reduced vertical momentum, in turn, causes the gas/liquid mixture to flow in a predominantly horizontal direction over the second end 42 of the weir 40 (through the circulation gap 37 defined at or near the surface 80 of the process fluid 35) and into the liquid phase of the process fluid 35 within the volume 71.

This flow pattern around the weir 40 affects the dispersion of the combustion gas into the continuous liquid phase of the process fluid 35 and, in particular, thoroughly agitates the continuous liquid phase of the process fluid 35 within the vessel 30 while creating a substantially horizontal flow pattern of the gas/liquid mixture at or near the surface 80 of the continuous liquid phase of the process fluid 35. This horizontal flow pattern significantly mitigates the potential for entrained liquid droplets to be carried vertically upward along with the dispersed gas phase as the dispersed gas phase rises through the liquid phase due to buoyancy and finally disengages from the continuous liquid phase of the process fluid at the surface 80 of the process fluid 35.

Also, the mixing action created by the induced flow of liquid and liquid/gas mixtures within both the confined volume 70 and the volume 71 hinders the formation of large crystals of precipitates, which generally requires a quiescent environment. By selectively favoring the production of relatively small particles of precipitates, the mixing action within vessel 30 helps to ensure that suspended particles formed in the submerged gas evaporation process may be maintained in suspension within the liquid phase circulating around the weir 40, which effectively mitigates the formation of blockages and fouling within the submerged gas evaporator. Likewise, because relatively small particles that are readily maintained in suspension are formed through precipitation, the efficiency of the evaporator is improved over conventional evaporation systems in terms of freedom from clogging and fouling and the degree to which the feed liquid may be concentrated.

In addition, as the circulating liquid phase within volume 71 approaches the bottom wall 31 of the vessel 30, the liquid phase is forced to flow in a predominantly horizontal direction and through the lower gap 36 into the confined volume 70. This predominantly horizontal flow pattern near the bottom wall 31 of the vessel 30 creates a scouring action at and above the interior surface of the bottom wall 31 which maintains particles of solids including precipitates in suspension within the circulating liquid while the submerged combustion gas evaporator is operating. The scouring action at and near the bottom wall 31 of the vessel 30 also provides means to re-suspend settled particles of solids whenever the submerged gas evaporator is re-started after having been shutdown for a period of time sufficient to allow suspended particles to settle on or near the bottom wall 31.

As is known, submerged gas evaporation is a process that affects evaporation by dispersing a gas within a liquid or liquid mixture, which may be a compound, a solution or slurry. Within a submerged gas evaporator heat and mass transfer operations occur simultaneously at the interface formed by the dynamic boundaries of the discontinuous gas and continuous liquid phases. Thus, all submerged gas evaporators include some method to disperse gas within a continuous liquid phase. The system shown in FIG. 1 however integrates the functions of dispersing the gas into the liquid phase, providing thorough agitation of the liquid phase, and mitigating entrainment of liquid droplets with the gas phase as the gas disengages from the liquid. Additionally, the turbulence and mixing that occurs within the vessel 30 due to the flow pattern created by dispersion of gas into liquid within the confined volume 70 reduces the formation of large crystals of precipitates and/or large agglomerates of smaller particles within the vessel 30.

Figure 2:
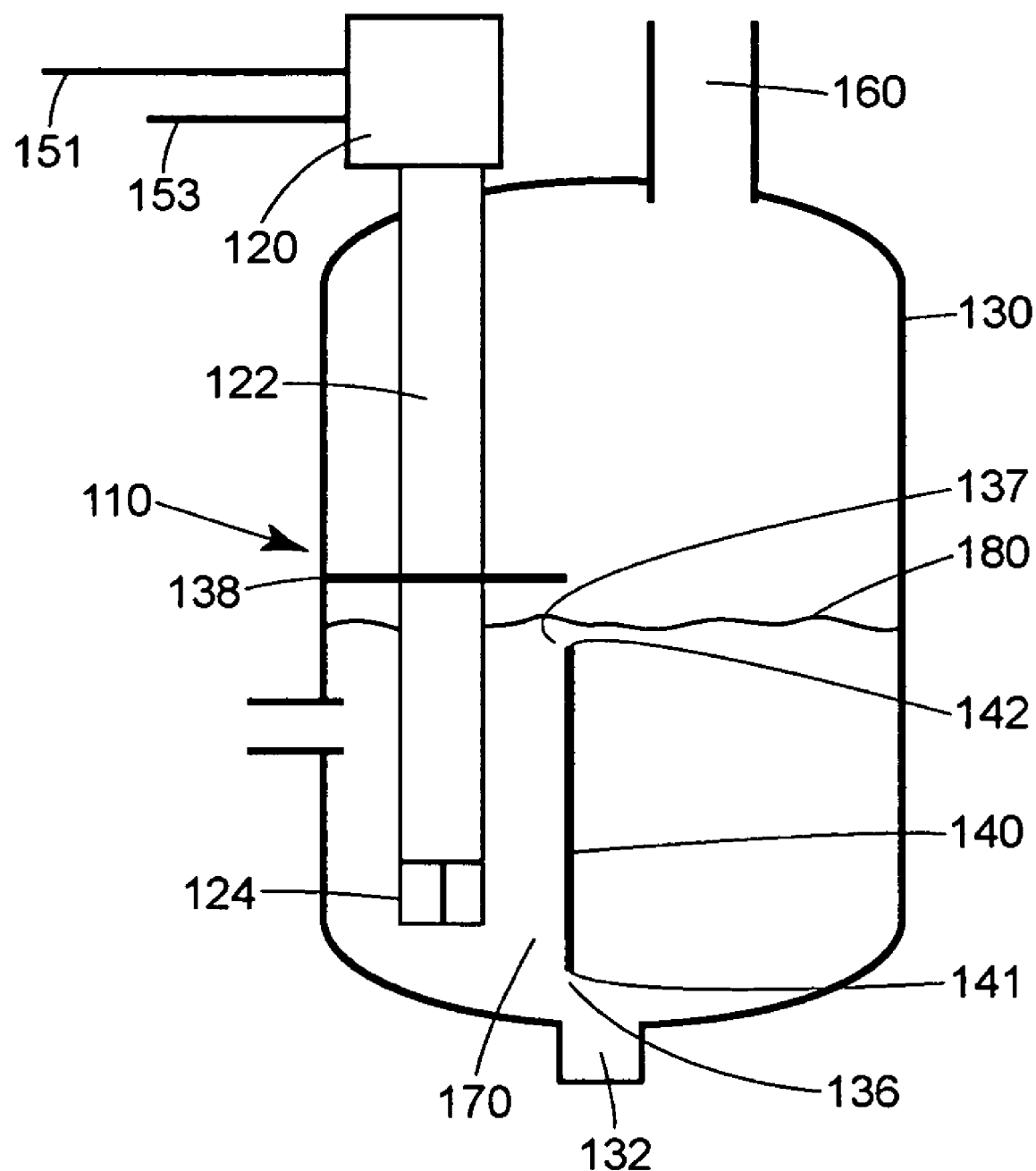
FIG. 2 is a cross-sectional view of a second submerged gas processor including a baffle.

FIG. 2 illustrates a second embodiment of a submerged gas processor 110, which is very similar to the submerged gas evaporator 10 of FIG. 1 and in which elements shown in FIG. 2 are assigned reference numbers being exactly 100 greater than the corresponding elements of FIG. 1. Unlike the device of FIG. 1, the submerged gas processor 110 includes a baffle or a shield 138 disposed within the vessel 130 at a location slightly above or slightly below the fluid surface 180 and above the second end 142 of the weir 140. The baffle or shield 138 may be shaped and sized to conform generally to the horizontal cross-sectional area of the confined volume 170. Additionally, if desired, the baffle 138 may be mounted to any of the gas inlet tube 122, the vessel 130 or the weir 140. The baffle 138 augments the force of gravity near the balance point by presenting a physical barrier that abruptly and positively eliminates the vertical components of velocity and hence, momentum, of the gas/liquid mixture, thereby assisting the mixture to flow horizontally outward and over the weir 140 at the upper circulation gap 137.

As will be understood, the weirs 40 and 140 of FIGS. 1 and 2 may be generally flat plates or may be curved plates that extend across the interior of the vessel 30 between different, such as opposite, sides of the vessel 30. Basically, the weirs 40 and 140 create a wall within the vessel defining and separating the volumes 70 and 71 (and 170 and 171). While the weirs 40 and 140 are preferably solid in nature they may, in some cases, be perforated, for instance, with slots or holes to modify the flow pattern within the vessel 10 or 110, or to attain a particular desired mixing result within the volume 71 or 171 while still providing a substantial barrier between the volumes 70 and 71 or 170 and 171. Additionally, while the weirs 40 and 140 preferably extend across the vessels 30 and 130 between opposite walls of the vessels 30 and 130, they may be formed into any desired shape so long as a substantial vertical barrier is formed to isolate one volume 70 (or 170) closest to the gas inlet tube 22 from the volume 71 (or 171) on the opposite side of the weir 40, 140.

Figure 3:
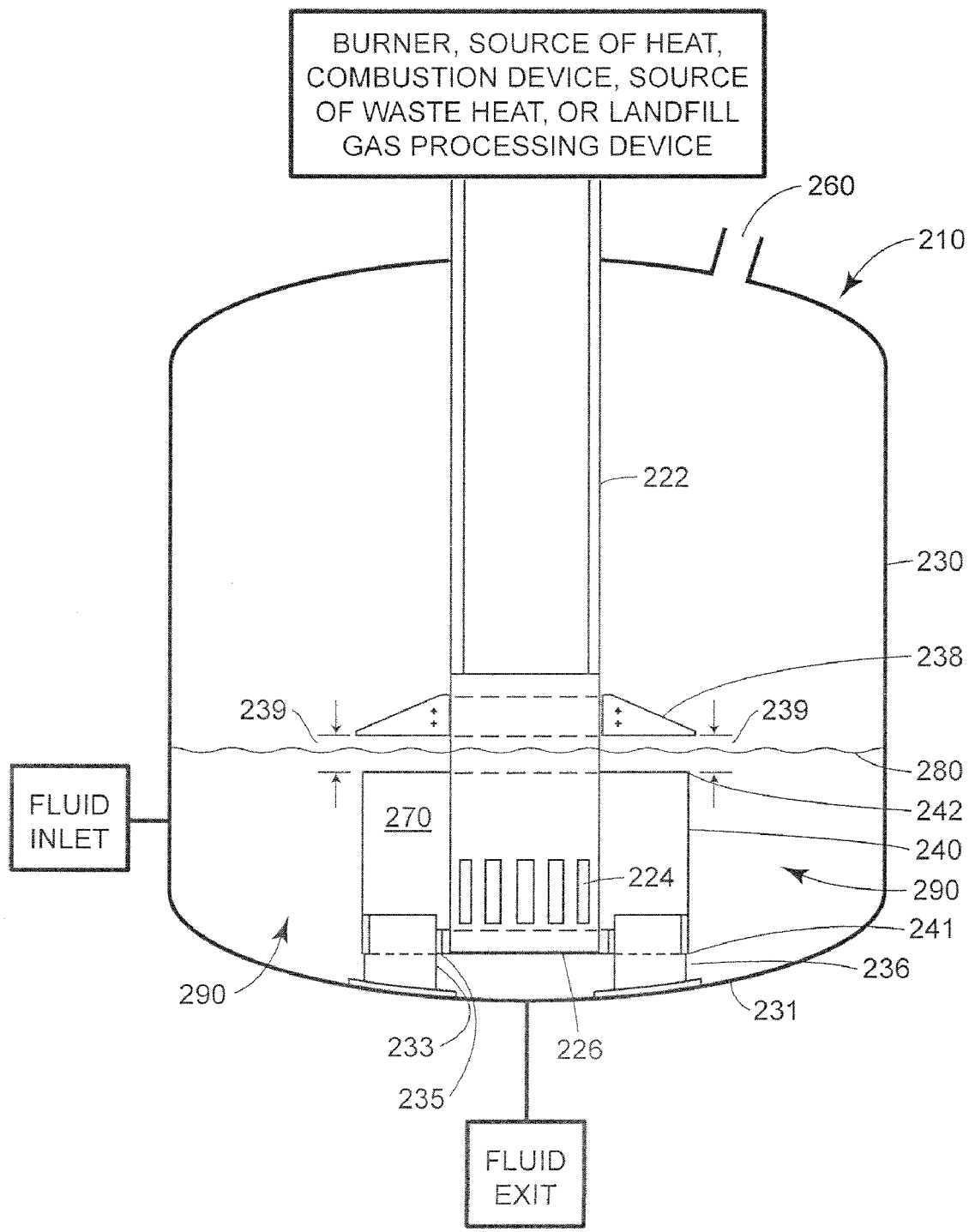
FIG. 3 is a cross-sectional view of a third submerged gas processor having a tubular shaped weir.

FIG. 3 illustrates a cross-sectional view of a further submerged gas processor 210 having a weir 240 that extends around a gas inlet tube 222. The submerged gas processor 210, which may be a submerged gas evaporator, a submerged gas chemical reactor or a combination submerged gas evaporator/chemical reactor, generally speaking has evaporative capacity equivalent to approximately 10,000 gallons per day on the basis of evaporating water from process liquid. A combustion device (not shown in FIG. 3) delivers approximately 2,200 standard cubic feet per minute (scfm) of combustion gas at 1,400° F. or approximately 11,058 actual cubic feet per minute (acfm) to the gas inlet tube 222. While the dimensions of the submerged gas processor 210 are exemplary only, the ratios between these dimensions may serve as a guide for those skilled in the art to achieve a desirable balance between three desirable process results including:1) preventing the formation of large crystals of precipitates and/or agglomerates of solid particles while maintaining solid particles as a homogeneous suspension within the process liquid by controlling the degree of overall mixing within vessel 230;2) enhancing the rates of heat and mass transfer and any desirable chemical reactions by controlling the turbulence and hence interfacial surface area created between the gas and liquid phases within confined volume 270; and 3) mitigating the potential of entraining liquid droplets in the gas as the gas stream disengages from the liquid phase at the liquid surface 280 by maintaining a desirable and predominately horizontal velocity component for the gas/liquid mixture flowing outward over the second end 242 of the weir 240 and along the surface of the liquid 280 within vessel 230. As illustrated in FIG. 3, the submerged gas processor 210 includes a vessel 230 with a dished bottom having an interior volume and a vertical gas inlet tube 222 at least partially disposed within the interior volume of the vessel 230. In this case, the gas inlet tube 222 has a diameter of approximately 20 inches and the overall diameter of the vessel 230 is approximately 120 inches, but these diameters may be more or less based on the design capacity and desired process result as relates to both gas and liquid flow rates and the type of combustion device (not shown in FIG. 3) supplying hot gas to the submerged gas processor. In this example the weir 240 has a diameter of approximately 40 inches with vertical walls approximately 26 inches in length. Thus, the weir 240 forms an annular confined volume 270 within vessel 230 between the inner wall of the weir 240 and the outer wall of the gas inlet tube 222 of approximately 6.54 cubic feet. In the embodiment of FIG. 3, twelve sparge ports 224 are disposed near the bottom of the gas inlet tube 222. The sparge ports 224 are substantially rectangular in shape and are, in this example, each approximately 3 inches wide by 7¼ inches high or approximately 0.151 ft$^2$ in area for a combined total area of approximately 1.81 ft$^2$ for all twelve sparge ports 224. Thus, in this example the ratio of gas flow per unit sparge port area is approximately 6100 acfm per ft$^2$ at the hot gas operating temperature within the gas inlet tube 222, in this case 1,400° F.

As will be understood, the combustion gas exits the gas inlet tube 222 through the sparge ports 224 into a confined volume 270 formed between the gas inlet tube 222 and a tubular shaped weir 240. In this case, the weir 240 has a circular cross-sectional shape and encircles the lower end of the gas inlet tube 222. Additionally, the weir 240 is located at an elevation which creates a lower circulation gap 236 of approximately 4 inches between a first end 241 of the weir 240 and a bottom dished surface 231 of the vessel 230. The second end 242 of the weir 240 is located at an elevation below a normal or at rest operating level of the process fluid within the vessel 230. Further, a baffle or shield 238 is disposed within the vessel 230 approximately 8 inches above the second end 242 of the weir 240. The baffle 238 is circular in shape and extends radially outwardly from the gas inlet tube 222. Additionally, the baffle 238 is illustrated as having an outer diameter somewhat greater than the outer diameter of the weir 240 which, in this case, is approximately 46 inches. However, the baffle 238 may have the same, a greater or smaller diameter than the diameter of the weir 240 if desired. Several support brackets 233 are mounted to the bottom surface 231 of the vessel 230 and are attached to the weir 240 near the first end 241 of the weir 240. Additionally, a gas inlet tube stabilizer ring 235 is attached to the support brackets 233 and substantially surrounds the bottom end 226 of the gas inlet tube 222 to stabilize the gas inlet tube 222 during operation.

During operation of the submerged gas reactor 210, the combustion gases are ejected through the sparge ports 224 into the confined volume 270 between the outer wall of the gas inlet tube 222 and the inside wall of the weir 242 creating a mixture of gas and liquid within the confined volume 270 that is significantly reduced in bulk density compared to the average bulk density of the fluid located in the volume 290 outside of the wall of the weir 240. This reduction in bulk density of the gas/liquid mixture within confined volume 270 creates an imbalance in head pressure at all elevations between the surface of the liquid 280 within vessel 230 and the first end 241 of the weir 240 when comparing the head pressure within the confined volume 270 and head pressure within the volume 290 outside of the wall of the weir 240 at equal elevations. The reduced head pressure within the confined volume 270 induces a flow pattern of liquid from the higher head pressure regions of volume 290 through the circulation gap 236 and into the confined volume 270. Once established, this induced flow pattern provides vigorous mixing action both within the confined volume 270 and throughout the volume 290 as liquid from the surface 280 and all locations within the volume 290 is drawn downward through the circulation gap 236 and upward due to buoyancy through the confined volume 270 where the gas/liquid mixture flows outward over the second end 242 of the weir 240 and over the surface of the liquid 280 confined within the vessel 230.

Within confined volume 270, the induced flow pattern and resultant vigorous mixing action creates significant shearing forces that are primarily based on the gross difference in specific gravity and hence momentum vectors between the liquid and gas phases at all points on the interfacial surface area of the liquid and gas phases. The shearing forces driven by the significant difference in specific gravity between the liquid and gas phases, which is, generally speaking, of a magnitude of 1000:1 liquid to gas, cause the interfacial surface area between the gas and liquid phases to increase significantly as the average volume of each discrete gas region within the mixture becomes smaller and smaller due to the shearing force of the flowing liquid phase. Thus, as a result of the induced flow pattern and the associated vigorous mixing within the confined area 270, the total interfacial surface area increases as the gas/liquid mixture flows upward within confined volume 270. This increase in interfacial surface area or total contact area between the gas and liquid phases favors increased rates of heat and mass transfer and chemical reactions between constituents of the gas and liquid phases as the gas/liquid mixture flows upward within confined volume 270 and outward over the second end 242 of the weir 240.

At the point where gas/liquid mixture flowing upward within confined volume 270 reaches the elevation of the fluid surface 280 and having passed beyond the second edge 242 of the weir 240, the difference in head pressure between the gas/liquid mixture within the confined volume 270 and the liquid within volume 290 fluid is eliminated. Absent the driving force of differential head pressure and the confining effect of the wall of the weir 240, gravity and the resultant buoyancy of the gas phase within the liquid phase become the primary outside forces affecting the continuing flow patterns of the gas/liquid mixture exiting the confined space 270. The combination of the force of gravity and the impenetrable barrier created by the baffle 238 in the vertical direction eliminates the vertical velocity and momentum components of the flowing gas/liquid mixture at or below the elevation of the bottom of the baffle 238 and causes the velocity and momentum vectors of the flowing gas/liquid mixture to be directed outward through the gap 239 created by the second end 242 of the weir 240 and the bottom surface of the baffle 238 and downwards near the surface of the liquid 280 within the vessel 230 causing the continuing flow pattern of the gas/liquid mixture to assume a predominantly horizontal direction. As the gas/liquid mixture flows outwards in a predominantly horizontal direction, the horizontal velocity component continually decreases causing a continual reduction in momentum and a reduction of the resultant shearing forces acting at the interfacial area within the gas/liquid mixture. The reduction in momentum and resultant shearing forces allows the force of buoyancy to become the primary driving force directing the movement of the discontinuous gas regions within the gas/liquid mixture, which causes discrete and discontinuous regions of gas to coalesce and ascend vertically within the continuous liquid phase. As the ascending gas regions within the gas/liquid mixture reach the surface 280 of the liquid within the vessel 230, buoyancy causes the discontinuous gas phase to break through the liquid surface 280 and to coalesce into a continuous gas phase that is directed upward within the confines of the vessel 230 and into the vapor exhaust duct 260 under the influence of the differential pressure created by the blower or blowers (not shown in FIG. 3) supplying combustion gas to the submerged gas processor 210.

Figure 4:
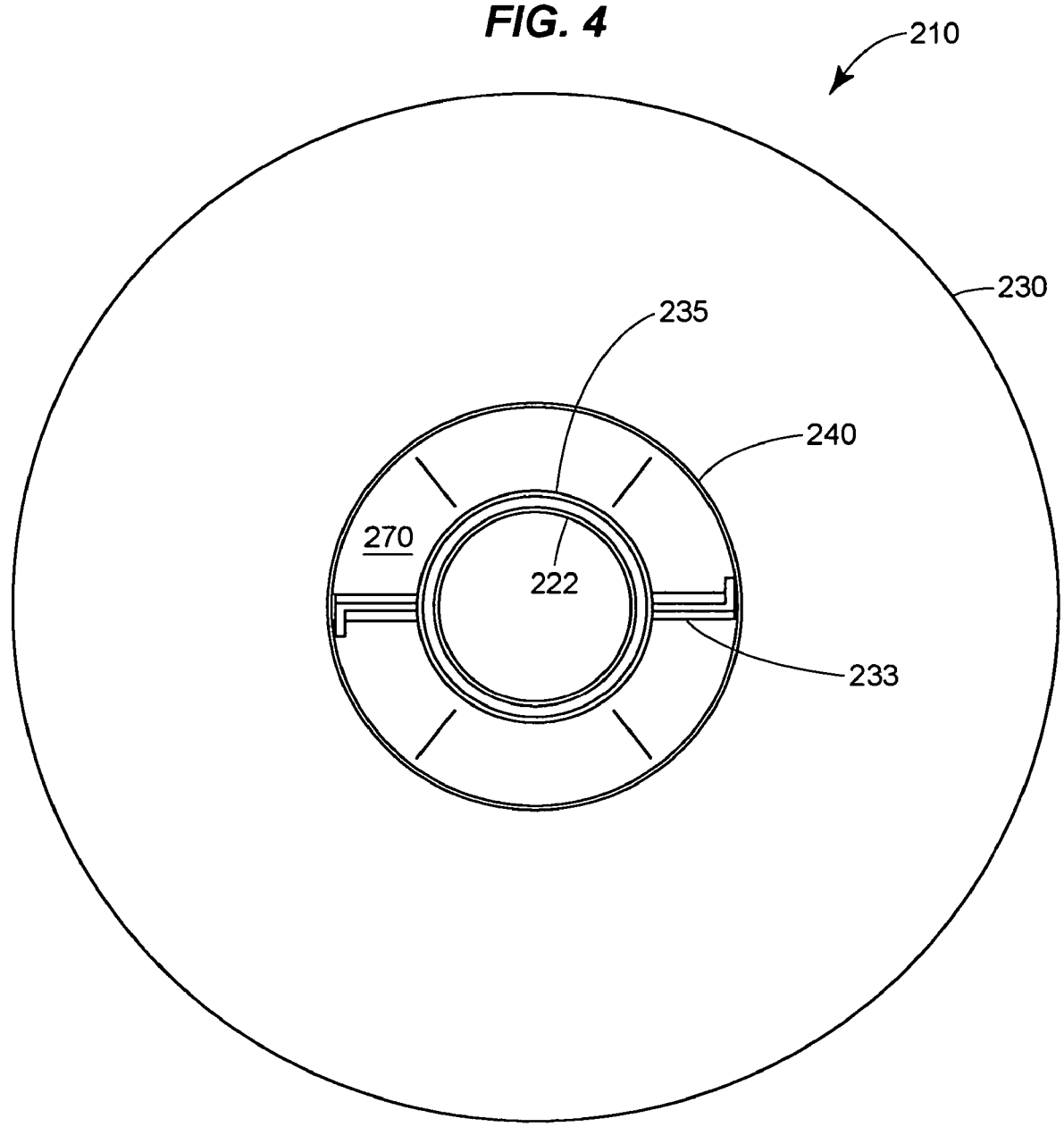
FIG. 4 is a top plan view of the submerged gas processor of FIG. 3.

FIG. 4 is a top plan view of the submerged gas reactor 210 of FIG. 3 illustrating the tubular nature of the weir 240. Specifically, the generally circular gas inlet tube 222 is centrally located and is surrounded by the stabilizer ring 235. In this embodiment, the stabilizer ring 235 surrounds the gas inlet tube 222 and essentially restricts any significant lateral movement of the gas inlet tube 222 due to surging or vibration such as might occur upon startup of the system. While the stabilizer ring 235 of FIG. 4 is attached to the support brackets 233 at two locations, more or fewer support brackets 233 may be employed without affecting the function of the submerged gas reactor 210. The weir 240, which surrounds the gas inlet tube 222 and the stabilizer ring 235, and is disposed co-axially to the gas inlet tube 222 and the stabilizer ring 235, is also attached to, and is supported by the support brackets 233. In this embodiment, the confined volume 270 is formed between the weir 240 and the gas inlet tube 222 while the second volume 290 is formed between the weir 240 and the side walls of the vessel 230. As will be understood, in this embodiment, the introduction of the gas from the exit ports 224 of the gas inlet tube 220 causes process fluid to flow in an essentially toroidal pattern around the weir 240.

Some design factors relating to the design of the submerged gas processor 210 illustrated in FIGS. 3 and 4 are summarized below and may be useful in designing larger or smaller submerged gas processors, which may be used as evaporators or as chemical reaction devices or both. The shape of the cross sectional area and length of the gas inlet tube is generally set by the allowable pressure drop, the configuration of the process vessel, and the costs of forming suitable material to match the desired cross sectional area, and, importantly, if direct fired, the characteristics of the burner that is coupled to the submerged gas processor. However, it is desirable that the outer wall of the gas inlet tube 222 provides adequate surface area for openings of the desired shape and size of the sparge ports which in turn admit the gas to the confined volume 290. For a typical submerged gas evaporator, submerged gas reactor or combination submerged gas evaporator/reactor, the vertical distance between the top edge 242 of the weir 240 and the top edge of the sparge ports should be not less than about 6 inches and preferably is at least about 17 inches. Selecting the shape and, more particularly, the size of the sparge port 224 openings is a balance between allowable pressure drop and the initial amount of interfacial area created at the point where the gas is dispersed into the flowing liquid phase within confined volume 290. The open area of the sparge ports 224 is generally more important than the shape, which can be most any configuration including, but not limited to, rectangular, trapezoidal, triangular, round, oval. In general, the open area of the sparge ports 224 should be such that the ratio of gas flow to total combined open area of all sparge ports should at least be in the range of 1,000 to 18,000 acfm per $ft^2$, preferably in the range of 2,000 to 10,000 acfm/$ft^2$ and more preferably in the range of 4,000 to 8,000 acfm/$ft^2$, where acfm is referenced to the operating temperature within the gas inlet tube. Likewise, the ratio of the gas flow to the cross sectional area of the confined volume 270 should be at least in the range of 200 to 10,000 scfm/$ft^2$, preferably in the range of 50 to 6,000 scfm/$ft^2$ and more preferably in the range of 1,000 to 2,500 scfm/$ft^2$. Additionally, the ratio of the cross sectional area of the vessel 230 to the cross sectional area of the confined volume 270 ($CSA_{vessel}$) is preferably in the range from three to one (3.0:1) to twelve-hundred to one (1200:1), is more preferably in the range from five to one (5.0:1) to one-hundred to one (100:1) and is highly preferably in the range of about ten to one (10:1) to fourteen to one (14:1). These ratios are summarized in the table below. Of course, in some circumstances, other ratios for these design criteria could be used as well or instead of those particularly described herein.

TABLE 1

| Ratios | Preferred Embodiment | Acceptable Range | Preferred Range |
|---|---|---|---|
| acfm/Total $CSA_{sparge\ ports}$ | 4,000-8,000 acfm/$ft^2$ | 1,000-18,000 acfm/$ft^2$ | 2,000-10,000 acfm/$ft^2$ |
| scfm/ $CSA_{confined\ volume}$ | 1,000-2,000 scfm/$ft^2$ | 200-10,000 scfm/$ft^2$ | 500-6,000 scfm/$ft^2$ |
| $CSA_{vessel}$/ $CSA_{confined\ volume}$ | 10:1-14:1 | 3.0:1-1,200:1 | 5.0:1-100:1 |

Figure 5:
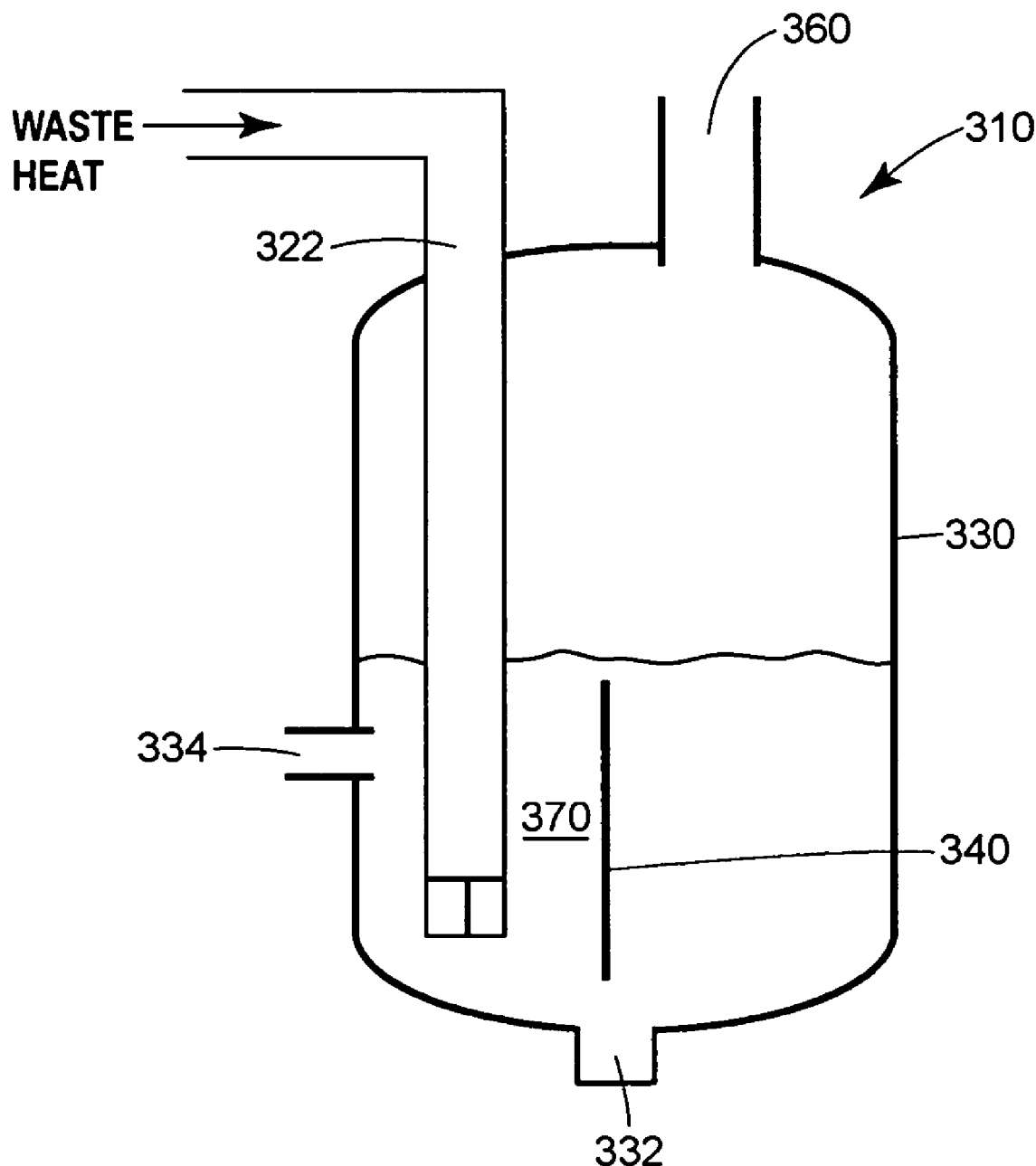
FIG. 5 is a cross-sectional view of a fourth submerged gas processor connected to a source of waste heat.

Turning now to FIG. 5, a submerged gas processor in the form of a submerged-gas reactor 310 is shown which is similar to the submerged gas evaporator of FIG. 1, and in which like components are labeled with numbers exactly 300 greater than the corresponding elements of FIG. 1. Unlike the device 10 of FIG. 1, the submerged gas reactor 310 of FIG. 5 does not include a pressurized burner but, alternatively, receives hot gases directly from an external source, which may be for example, a flare stack, a reciprocating engine, a turbine, or other source of waste heat. The hot gases supplied by the external source may include gases having a wide range of temperature and/or specific components and these hot gases may be selected by one skilled in the art to achieve any combination of a rate and degree of chemical reaction between components in the gas and liquid, a specific rate of evaporation or to create a specific concentration of the process fluid.

Figure 6:
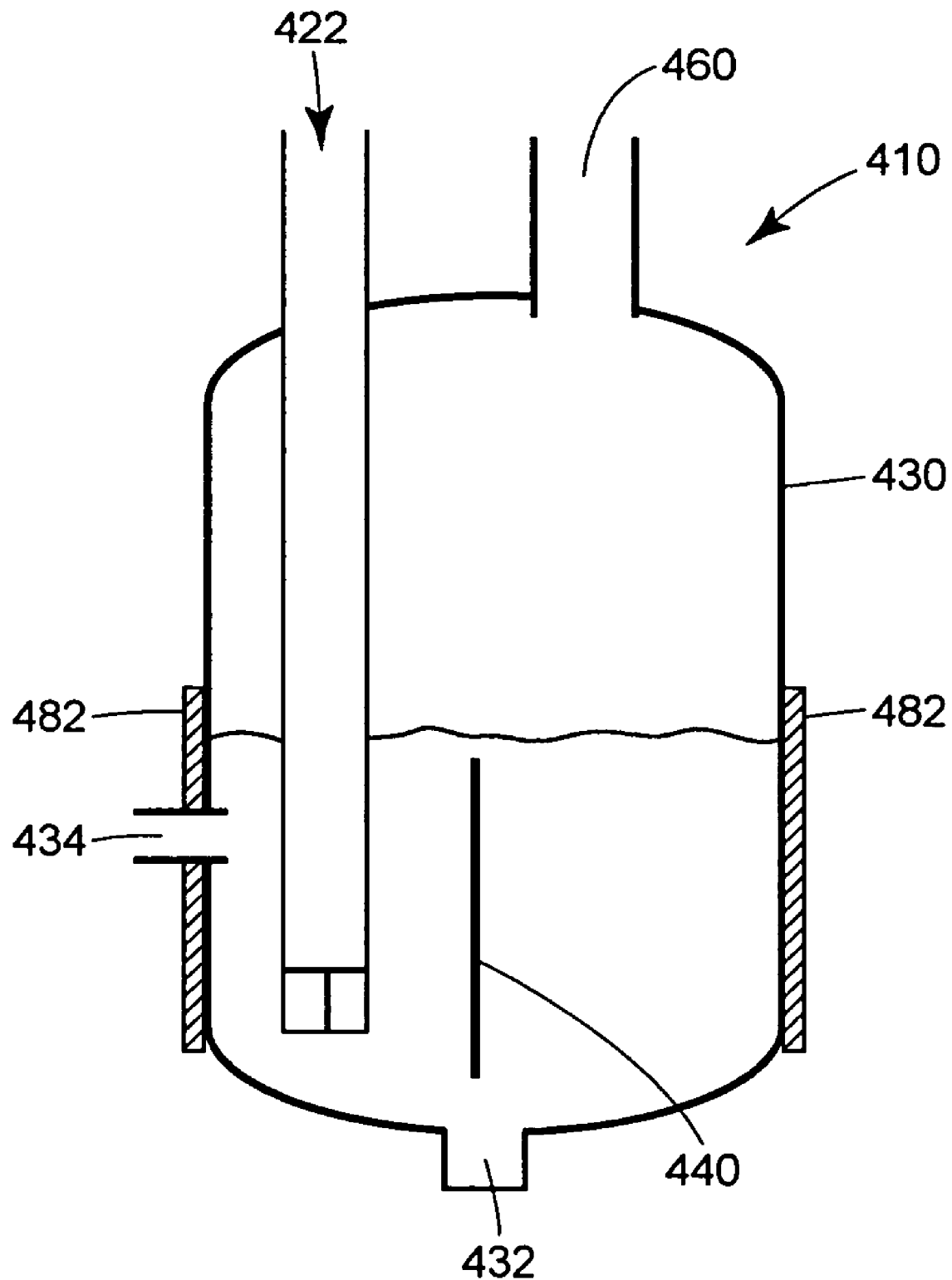
FIG. 6 is a cross-sectional view of a submerged gas processor having a heating blanket disposed around an exterior portion thereof.

FIG. 6 illustrates a submerged gas processor 410 which is similar to the submerged gas processors of FIGS. 1, 2 and 5, in which like elements are labeled with reference numbers exactly 400 greater than those of FIG. 1. However, the submerged gas reactor 410 includes a jacket 482 at least partially surrounding the vessel 430. The jacket 482 may be used to assist in heating the fluid within the vessel 430, or alternately in cooling the process fluid within the vessel 430 as may be desirable to provide for a better or more complete evaporation process, or to provide for better reactions, such as chemical reactions or precipitation of components from the process fluid. Thus, the jacket 482 may be a heating or a cooling jacket. Alternatively or in addition, the process fluid may be heated or cooled by other or additional elements before entering the vessel 430, by recirculation from and to vessel 430 through other or additional elements external to or even internal to the vessel 430, or by withdrawal from vessel 430 through other or additional elements external to tank 430. For heating purposes the jacket 482, other or additional external elements may be supplied using steam or other heat transfer fluids, electric resistive heating elements, hot gases, or any other manner of providing heat. For cooling purposes the jacket 482, other or additional external elements may be supplied with water or other cold fluids such as antifreeze solutions or gas. Thus, in one example, the jacket 482 may allow gases having a wide range of temperatures to be introduced into and used within the vessel 430 to promote a particular chemical reaction or series of reactions within the vessel 430 between the gas and the process fluid or to promote a desired amount of evaporation within the vessel 430. The gas can be a pure reactant, a mixture of reactants, or a mixture of reactant gases and diluent gas or gases. In addition, selected degree of evaporation may be employed in combination with a chemical reaction or any combination of chemical reactions. Of course, such heating or cooling jackets may be used in, for example, the embodiment of the submerged gas processor of FIGS. 1-5 or any other embodiment.

It will be understood that, because the weir and gas dispersion configurations within submerged gas processors illustrated in the embodiments of FIGS. 1-6 provide for a high degree of mixing, induced turbulent flow and the resultant intimate contact between liquid and gas within the confined volumes 70, 170, 270, etc., the submerged gas processors of FIGS. 1-6 create a large interfacial surface area for the interaction of the process fluid and the gas provided via the gas inlet tube, leading to very efficient heat and mass transfer between gas and liquid phases and/or high rates of chemical reactions between components within these two phases. Furthermore, the use of the weir and, if desired, the baffle, to cause a predominantly horizontal flow pattern of the gas/liquid mixture at the surface of the fluid process mixture mitigates or eliminates the entrainment of droplets of process liquid within the exhaust gas. Still further, the high degree of turbulent flow within the vessel mitigates or reduces the formation of large crystals or agglomerates and maintains the mixture of solids and liquids within the evaporator/reactor vessel in a homogeneous state to prevent or reduce settling of precipitated solids. This factor, in turn, reduces or eliminates the need to frequently clean the reactor vessel and, in the case of evaporation processes, allows the process to proceed to a very high state of concentration by maintaining precipitates in suspension. In the event that such solids do form, however, they may be removed via the outlet port 32 (FIG. 1) using a conventional valve arrangement.

While a couple of different types submerged gas processors having different weir configurations are illustrated herein, it will be understood that the shapes and configurations of the components, including the weirs, baffles and gas entry ports, used in these devices could be varied or altered as desired. Thus, for example, while the gas inlet tubes are illustrated as being circular in cross section, these tubes could be of any desired cross sectional shape including, for example, square, rectangular, oval, etc. Additionally, while the weirs illustrated herein have been shown as flat plates or as tubular members having a circular cross-sectional shape, weirs of other shapes or configurations could be used as well, including weirs having a square, rectangular, oval, or other cross sectional shape disposed around a fire or other gas inlet tube, weirs being curved, arcuate, or multi-faceted in shape or having one or more walls disposed partially around a fire or gas inlet tube, etc. Also, the gas entry ports shown as rectangular may assume most any shape including trapezoidal, triangular, circular, oval, or triangular.

Still further, as will be understood, the terms submerged gas reactor, submerged gas evaporator and submerged gas processor have been used herein to generally describe and to include both submerged gas evaporators and submerged gas chemical reactors as well as other devices. As a result, any of the submerged gas processors described or illustrated herein may be used as evaporators or as chemical reaction devices or both. Likewise, the principles described herein may be used on a submerged combustion gas evaporator or reaction device, e.g., one that combusts fuel to create the gas, or on a non-combustion gas evaporator or reaction device, e.g., one that accepts gas from a different source. In the later case, the gas may be heated gas from any desired source, such as an output of a reciprocating engine or a turbine, a process fueled by landfill gas, or any other source of heated gas. Such a reciprocating engine or turbine may operate on landfill gas or on other types of fuel. Of course, generally speaking, the submerged gas processors described herein may be connected to any source of waste heat and/or may be connected to or include a combustion device of any kind that, for example, combusts one or a combination of a biogas, a solid fuel (such as coal, wood, etc.), a liquid fuel (such as petroleum, gasoline, fuel oil, etc.) or a gaseous fuel. Alternatively, the gas used in the submerged gas processor may be non-heated and may even be at the same or a lower temperature than the liquid or process fuel within the vessel, and may be provided to induce a chemical or physical reaction of some sort such as the formation of a desirable precipitate.

Still further, as will be understood by persons skilled in the art, the improved submerged gas processors described herein may be operated in continuous, batch or combined continuous and batch modes. Thus, in one instance the submerged gas processor may be initially charged with a controlled amount of liquid to be processed and operated in a batch mode. In the batch mode, liquid feed is continuously added to the submerged gas processor to maintain a constant predetermined level within the process vessel by replacing any components of the process fluid that are evaporated and/or reacted as the process proceeds. Once the batch process has reached a predetermined degree of concentration, completeness of a chemical reaction, amount or form of precipitate, or any combination of these or other desirable attributes, the process may be shutdown and the desirable product of the process may be withdrawn from the submerged gas processor for use, sale or disposal. Likewise, the submerged gas processor may be initially charged with a controlled amount of liquid to be processed and operated in a continuous mode. In the continuous mode, liquid feed would be continuously added to the submerged gas processor to maintain a constant predetermined level within the process vessel by replacing any components of the process fluid that are evaporated and/or reacted as the process proceeds. Once the fluid undergoing processing has reached a predetermined degree of concentration, completeness of a chemical reaction, amount or form of precipitate, or any combination of these or other desirable attributes, withdrawal of process fluid at a controlled rate from the process vessel would be initiated. The controlled withdrawal of process fluid would be set at an appropriate rate to maintain a desirable equilibrium between the rate of feed of the liquid and the gas, the rate of evaporation of components from the process liquid, and the rate at which the desired attribute or attributes of the processed fluid are attained. Thus, in the continuous mode, the submerged gas processor may operate for an indeterminate length of time as long as there is process feed liquid available and the process system remains operational. The combined continuous and batch mode refers to operation where, for instance, the amount of available feed liquid is in excess of that required for a single batch operation, in which case the process may be operated for relatively short periods in the continuous mode until the supply of feed liquid is exhausted.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A submerged gas processor comprising:
   a vessel having an interior adapted to hold a liquid;
   a tube disposed within the vessel and adapted to transport a gas into the interior of the vessel;
   a weir disposed within the vessel adjacent the tube in a manner that defines a confined volume between the tube and the weir;
   an exhaust stack adapted to transport exhaust gases from the interior of the vessel;
   a liquid inlet adapted to supply a liquid to the interior of the vessel; and
   a liquid outlet adapted to remove liquid from the interior of the vessel;
   wherein the weir includes a first weir end and a second weir end and is disposed within the vessel to define a first circulation gap between the first weir end and a first wall of the vessel and to define a second circulation gap between the second weir end and a second wall of the vessel which enables liquid within the vessel to flow through the first and second circulation gaps when gas is introduced into the vessel from the tube, and wherein a ratio of a cross-sectional area of the vessel to a cross-sectional area of a confined volume between the weir and the tube is in the range of approximately 10:1 to approximately 14:1.

2. The submerged gas processor of claim 1 further including a baffle disposed proximate the second circulation gap and generally perpendicular to the weir.

3. The submerged gas processor of claim 2, wherein the distance between the second weir end and the baffle is in the range of 1 to 20 inches.

4. The submerged gas processor of claim 2, wherein the baffle is attached to the tube.

5. The submerged gas processor of claim 1, wherein the tube includes a gas exit disposed below a surface of the liquid when liquid is disposed within the vessel.

6. The submerged gas processor of claim 5, further including a plurality of gas exits disposed in the tube, wherein each gas exit is substantially rectangular in shape.

7. The submerged gas processor of claim 5, wherein the tube is sized to deliver a ratio of gas flow in actual cubic feet per minute (acfm), as measured at the operating temperature of the gas flowing within the tube, to a cross sectional area of gas exit slots in the tube of between approximately 1,000 acfm/ft$^2$ and approximately 18,000 acfm/ft$^2$.

8. The submerged gas processor of claim 5, wherein the tube is sized to deliver a ratio of gas flow in actual cubic feet per minute (acfm), as measured at the operating temperature of the gas within the tube, to the cross sectional area of gas exit slots in the tube of between approximately 2,000 acfm/ft$^2$ and approximately 10,000 acfm/ft$^2$.

9. The submerged gas processor of claim 1, further including a support bracket attached to the vessel and attached to the weir.

10. The submerged gas processor of claim 9, further including a stabilizer ring attached to the support bracket and disposed between the tube and the weir.

11. The submerged gas processor of claim 1, wherein the tube is sized to deliver a ratio of gas flow in standard cubic feet per minute (scfm) out of the tube to a cross sectional area of the confined volume between the weir and the tube is in the range of approximately 200 scfm/ft$^2$ to approximately 10,000 scfm/ft$^2$.

12. The submerged gas processor of claim 1, wherein the tube is sized to deliver a ratio of gas flow in scfm out of the tube to a cross sectional area of the confined volume is in the range of approximately 500 scfm/ft$^2$ to approximately 6,000 scfm/ft$^2$.

13. The submerged gas processor of claim 1, wherein the weir comprises a tubular member disposed around the tube.

14. The submerged gas processor of claim 13, wherein the tubular member is circular in cross section.

15. The submerged gas processor of claim 13, wherein the tubular member is disposed co-axial to the tube.

16. The submerged gas processor of claim 1, further including a burner that operates on gaseous or liquid fuel attached to the tube.

17. The submerged gas processor of claim 1, wherein the tube is connected to a source of waste heat.

18. The submerged gas processor of claim 17, wherein the source of the waste heat is one or a combination of a landfill gas processing device, a reciprocating internal combustion engine operating on landfill gas and/or a turbine operating on landfill gas.

19. The submerged gas processor of claim 1, wherein the tube is connected to a source of heat.

20. The submerged gas processor of claim 19, wherein the source of heat is a combustion device.

21. The submerged gas processor of claim 20, wherein the combustion device includes one of a biogas inlet, a solid fuel inlet, a liquid fuel inlet and a gaseous fuel inlet.

* * * * *

UNITED STATES PATENT AND TRADEMARK OFFICE
CERTIFICATE OF CORRECTION

PATENT NO. : 7,416,172 B2 Page 1 of 1
APPLICATION NO. : 11/186459
DATED : August 26, 2008
INVENTOR(S) : Bernard F. Duesel, Jr. et al.

It is certified that error appears in the above-identified patent and that said Letters Patent is hereby corrected as shown below:

On the Title Page:

At field (57), line 19, "to;" should be -- to --.

Signed and Sealed this

Thirtieth Day of December, 2008

JON W. DUDAS
*Director of the United States Patent and Trademark Office*